Sept. 1, 1925.  1,552,272
J. F. CARNER
EXPLOSIVE ENGINE OR TURBINE
Filed April 18, 1921  4 Sheets-Sheet 1

Inventor
J. F. Carner,
By
Geo. P. Kimmel Attorney

Sept. 1, 1925.

J. F. CARNER 1,552,272

EXPLOSIVE ENGINE OR TURBINE

Filed April 18, 1921   4 Sheets-Sheet 2

Inventor
J.F. Carner,

By
Geo. F. Kimmel, Attorney

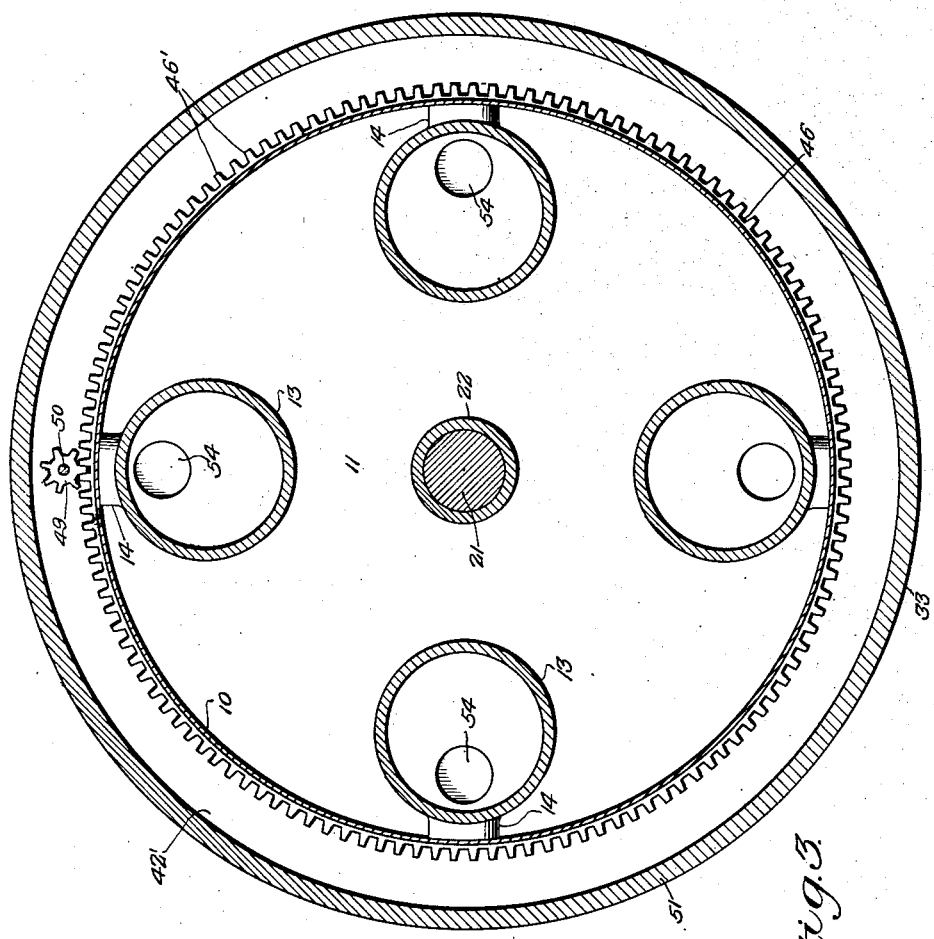
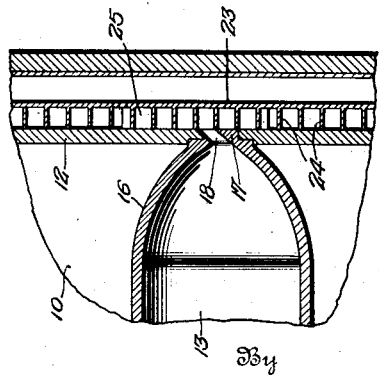

Sept. 1, 1925.  1,552,272
J. F. CARNER
EXPLOSIVE ENGINE OR TURBINE
Filed April 18, 1921  4 Sheets-Sheet 4

Inventor
J. F. Carner,
By
Geo. F. Kimmel
Attorney

Patented Sept. 1, 1925.

1,552,272

UNITED STATES PATENT OFFICE.

JAMES FREDERICK CARNER, OF WILSON, OKLAHOMA.

EXPLOSIVE ENGINE OR TURBINE.

Application filed April 18, 1921. Serial No. 462,334.

*To all whom it may concern:*

Be it known that I, JAMES FREDERICK CARNER, a citizen of the United States, residing at Wilson, in the county of Carter and State of Oklahoma, have invented certain new and useful Improvements in an Explosive Engine or Turbine, of which the following is a specification.

The invention relates to improvements in internal combustion engines of the rotary type generally, and more particularly to a construction and arrangement involving the principles of turbine forms of the same.

The main object of the invention is to provide for an engine of the class specified, and one of an extremely simplified, light weight and comparatively inexpensive construction, capable of developing maximum power from a minimum fuel consumption, and which is readily adaptable for use as the prime mover of automobiles, aeroplanes or the like.

A further and equally important object of the invention is to provide for an engine of the character mentioned, and one designed for efficient operation with a minimum number of moving parts, and in which all usual or ordinary forms of fuel and exhaust valves, and their necessary complicated operating mechanisms are dispensed with, whereby to effect the operation of the engine with a minimum inherent power loss, such as results in a delivery of a maximum of the power developed to the main shaft and consequently to the devices, mechanisms or vehicle to the driven by the same.

A further object of the invention is to provide the engine contemplated in the present invention with an effective means for cooling all parts of the same which are subjected to the heat of the fuel used as motive fluids for the operation thereof.

With the foregoing and other objects in view, the invention resides in the certain novel and useful construction and arrangement of parts as will be hereinafter more fully described, set forth in the appended claims, and illustrated in the accompanying drawings, in which:—

Figure 1:
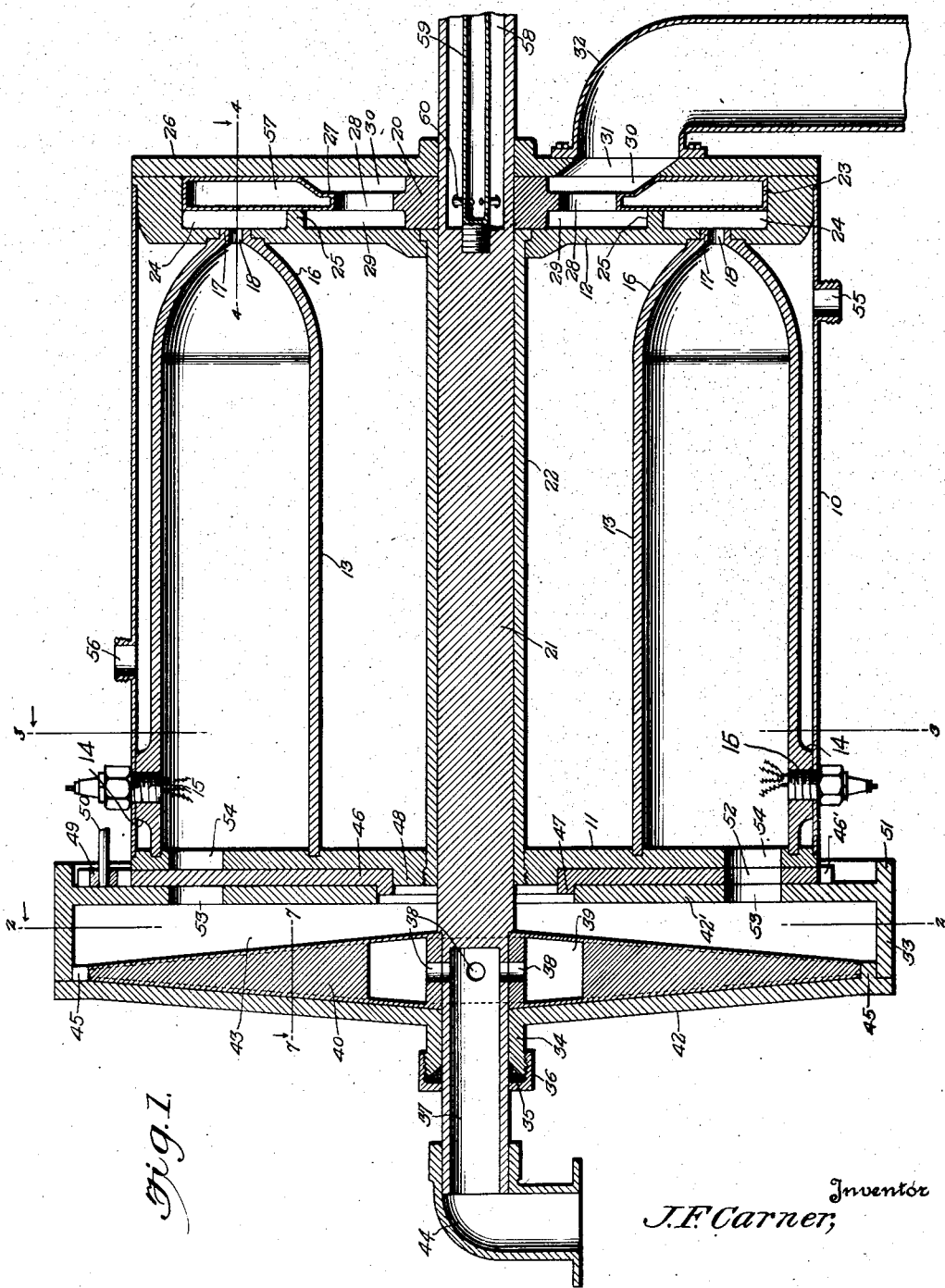
Figure 2:
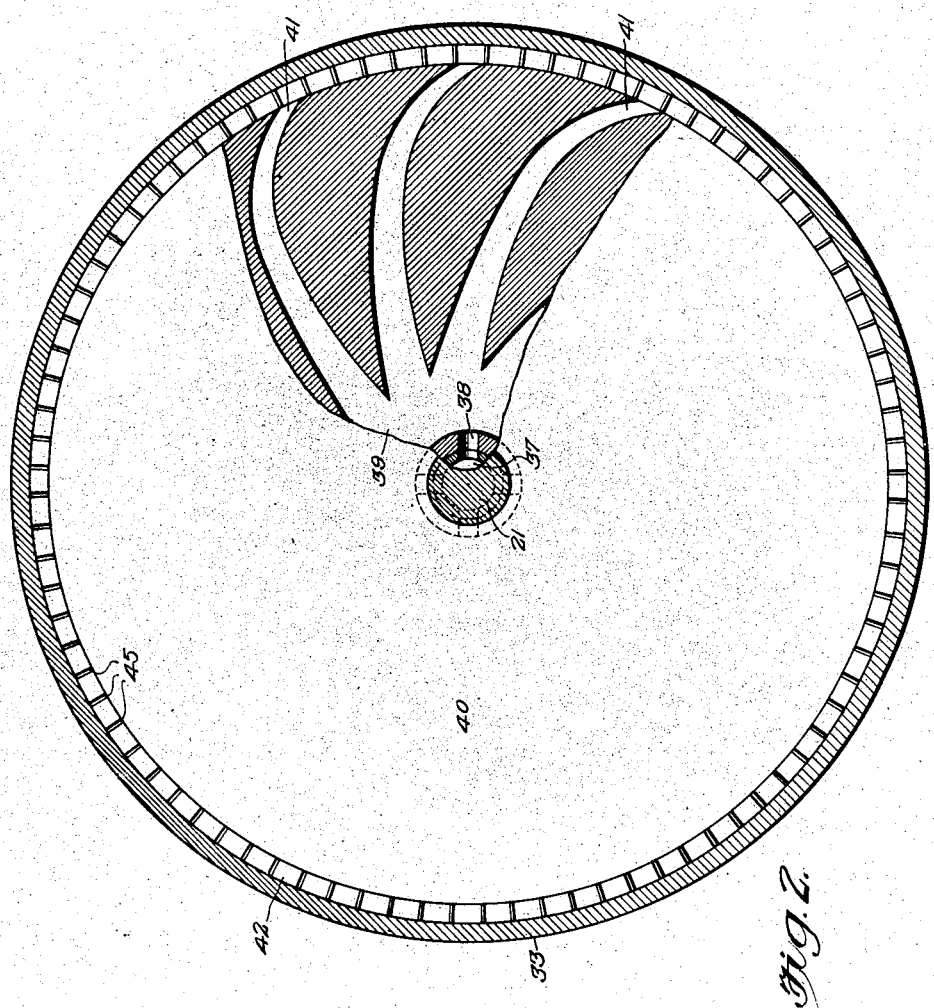
Figure 7:
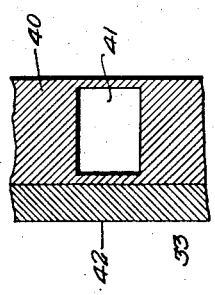
Figure 6:
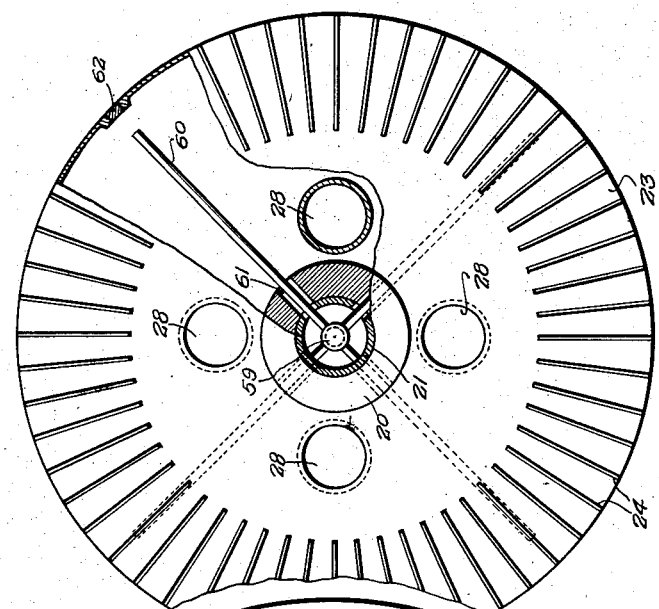
Figure 5:
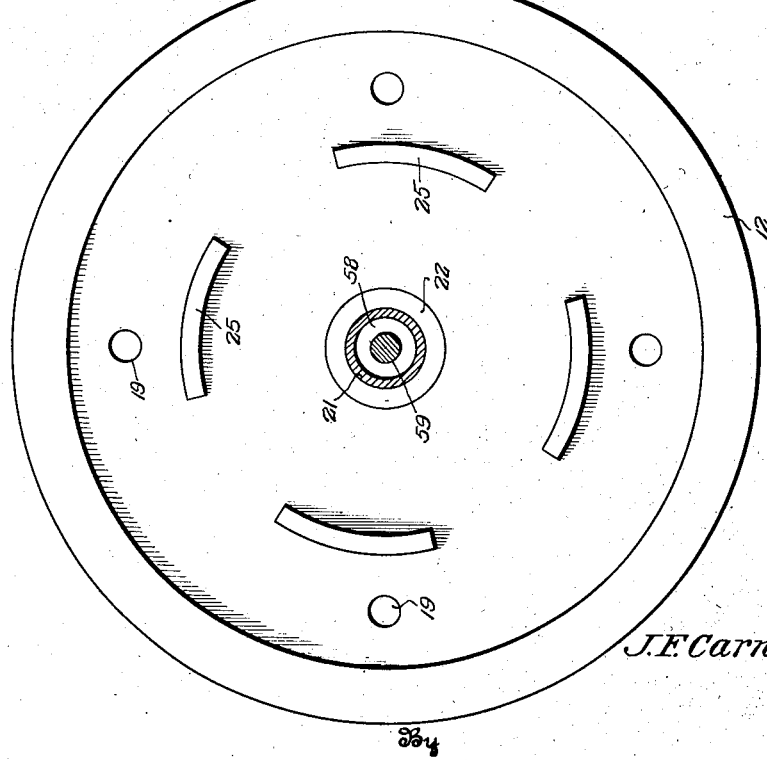

Figure 1 is a vertical longitudinal section through the preferred assembly of the engine, Fig. 2 is a vertical transverse section taken on lines 2—2 of Fig. 1, Fig. 3 is a similar view taken on lines 3—3 of Fig. 1, Fig. 4 is a fragmentary sectional detail taken on the line 4—4 of Fig. 1, Fig. 5 is an elevation on one end of the engine with the rotor and its enclosing end plate removed therefrom, Fig. 6 is an elevation of the inner face of the rotor, partly in section to show the manner of cooling the same, and, Fig. 7 is an enlarged sectional detail taken on the line 7—7 of Fig. 1.

Referring to the drawings, wherein similar characters of reference designate corresponding parts in the several views thereof, the numeral 10 indicates a cylindrical casing having its opposite ends closed by means of walls or plates 11 and 12, and arranged longitudinally within the casing 10 in circular series, one spaced equi-distantly from the other, are a number of cylinders or explosive chambers 13, connecting with the end plates 11 and 12 at their opposite ends. Each of the cylinders 13 is formed with a radially extending circular boss or enlargement 14, immediately inward from their inlet ends, which bosses or enlargements are arranged in contact with the inner wall of casing 10, whereby to space the cylinders 13 in parallel relation thereto, and which are provided with circular bores 15 in alinement with circular openings formed in the casing wall, and into which is to be secured any of the usual or ordinary types of spark plugs. The discharge ends of the cylinders 13 are tapered or otherwise reduced to substantially conical form, as at 16, and the extreme end portions 17 of the same are provided with angularly disposed discharge openings 18, these end portions 17 being seated in openings 19 formed in the end plate 12 for the purpose.

The outer face of the end plate 12 is machined or milled to provide a circular depression for the reception of the power element or rotor of the engine, and this rotor is formed to provide a hub portion 20 which is suitably keyed on a power shaft 21 extending centrally through the casing 10 and which is rotatable in a bearing sleeve 22 connecting the end plates 11 and 12. The hub portion 20 of the rotor is in the form of a centrally enlarged or thickened portion of a circular body portion 23, which is of a diameter to closely fit into the depression of the end plate 12, but is positioned with its inner face spaced from the opposed face of the latter, and with its outer face disposed flush in the plane of the outer end edge of the same. Extending radially inward from the peripheral edge of the inner face of the rotor body 23 are a series of equi-distantly spaced impact flanges or wings 24 which rotate in the circular path defined by the circular series of discharge openings 18 of the cylinders 13, and are impacted by the discharged gases from the latter at points medially of their inner and outer ends. Formed on the inner faces of the depressions of the end plate 12, at points below each of the discharge ports 18, are flanges or ribs 25 which are curved to closely underlie the path of movement of the inner ends of the impact flanges or wings 24, and are of a length to confine the discharged gases, from the ports 18, within the spaces between active members of the latter during a period of the rotation of the rotor body 23. The depression of the end plate 12 is normally closed by an outer end plate 26, after the rotor body 23 has been properly positioned within the same, and its hub portion 20 keyed or otherwise secured on the power shaft 21. The outer central portion of the rotor body 23 is formed to provide a depression 27 surrounding the hub portion 20, and opening through the wall of the depression 27 are a series of circular openings 28 which establish communication between the spaces 29 and 30 to either side of the rotor body, and which constitutes the exhaust manifold of the engine, the burnt gases being discharged from the active members of the impact flanges or wings 24 successively as they pass beyond the ends of the flanges or ribs 25, and between the opposed ends of the latter into the space 29, passing through the openings 28 and into the space 30, from which they are discharged to atmosphere through the opening 31, formed in the outer end plate 26, and the exhaust pipe 32 connecting the opening 31.

For admitting fuel to the cylinders 13, a fuel compression and distributing casing, or intake manifold 33 of cylindrical form, is mounted on the end of the engine casing 10 opposite to that on which the rotor is mounted. The casing 33 is of a greater diameter than the casing 10, and is disposed in concentric relation with respect to the latter. The adjacent end of the shaft 21 passes through the casing 33 and projects outwardly of the outer wall of the latter through the bore of a flanged bearing or boss 34 formed therewith, the outer end of the bearing or boss 34 being formed to receive a packing 35 and a screw cap 36, enclosing the packing, and compressing the same tightly around the shaft 21. This end of the shaft 21 is formed with a longitudinally disposed bore 37 which extends to a point within the casing or intake manifold 33, where it is provided with a series of radially opening ports 38 which connect the interior hollow hub portion 39 of an intake impeller 40 keyed on the shaft 21 for rotation therewith. This impeller 40 is formed with a thickened central hub portion 39, and is oppositely tapered outwardly therefrom to provide a peripheral edge of reduced thickness, substantially as shown, and extending outwardly on curved radial lines from the hollow hub portion are a series of ducts 41 which gradually decrease in cross-sectional area outward from their points of opening into the chamber of the hub, and have their outer ends disposed to discharge through the peripheral edge of the impeller body. The impeller 40 is arranged to rotate in close proximity to the outer wall 42 of the intake manifold or casing 33, so as to provide a fuel receiving chamber 43 therein immediately adjacent the intake end of the main casing 10, the wall 42 being outwardly convex to correspond to the formation of the adjacent wall of the impeller 40. The outer end of the intake end of the shaft 21 is provided with a coupling 44, preferably in the form of an L-shaped pipe coupling, and to it is to be connected any one of the numerous forms of carbureters (not shown) suitable for the purpose of properly forming the fuel charges to be drawn from the same into the manifold chamber 43 through the shaft duct 37, and the ducts of the impeller body 40. Formed on the inner face of the removable outer wall 42 of the manifold casing 33 are a series of equi-distantly spaced flanges or wings 45 which are disposed in the path of the peripheral edge of the impeller 40, and which are designed to create a suction at the discharge openings of the duct 41 of the latter, when it is being rotated, whereby fuel is to be drawn into the manifold chamber 43 from the carbureter.

For admitting the fuel charges to the cylinders 13 from the manifold chamber 43, a disc valve 46 is interposed between the adjacent end walls 11 and 42' of the main casing 10 and the manifold casing 33, respectively, substantially as is shown in Fig. 1, and the same is formed with a flanged hub portion 47 which is journalled on a bearing flange or boss 48 formed on the outer face of the end wall 11, of the main casing 10, the valve being of a slightly greater diameter than the latter so that its peripheral edge is outwardly of and in concentric relation with respect to the periphery of the wall of the casing 10. The exposed peripheral edge of the disc valve 46 is toothed, as at 46', after the manner of a gear, and is arranged in meshing relation with a pinion 49 which is carried on a shaft 50 to be driven from the main power shaft 21 in any suitable manner (not shown). The peripheral wall of the manifold casing 33 is flanged, as at 51, and this flange extends laterally from the inner end of the casing to enclose the opposed peripheral edge of the disc valve 46, and to protect the same from damage during the operation of the engine, and to otherwise protect the operator from injury therefrom, such as might occur should the toothed edge of the same, and its operating pinion 49 be left exposed. The disc valve 46 is provided with a port, or ports, 52 which is adapted to successively register with complementarily arranged and alined ports 53 and 54 formed respectively in the adjacent walls 11 and 42′ of the main casing 10 and the manifold casing 33, one pair of the ports 53 and 54 being associated with each of the cylinders 13.

For the purpose of cooling the cylinders 13, a cooling circulation of air or water may be maintained through the casing 10 as by admitting the cooling medium to the interior thereof through the inlet opening 55 and drawing the same therefrom to the outlet 56, in which case the cylinders 13 will be entirely surrounded by the cooling fluid at all times during the operation of the engine. It is also contemplated to cool the rotor 23, and for this purpose, the outer peripheral portion of the same is formed to provide an annular closed chamber 57 to which a cooling fluid is to be admitted, and discharged therefrom, through the medium of an inwardly extending duct 58 formed in the end of the shaft 21 on which the rotor is mounted. For the purpose of admitting the cooling fluid, a supply pipe 59 is concentrically disposed within the shaft duct 58, and has extending radially therefrom through the hub portion 20 of the rotor 23, a series of tubes 60 which project inwardly of the chamber 57 of the latter. The tubes 60 pass concentrically through openings 61 formed in the hub of the rotor, and these openings 61 are of a greater diameter than the mean diameter of the tubes, so that the cooling fluid may be discharged through the same from the chamber 57 and be drawn off directly through the duct 58 of the shaft 21. To facilitate the insertion of the tubes 60 into engagement with the pipe 59, after the same has been secured in the shaft duct 58, the peripheral wall of the rotor body 23 is provided with a threaded opening which is normally closed by means of a screw-plug 62.

In the operation of the engine thus provided, the power shaft 21 is turned over after the usual manner of starting, and a suction is created within the duct 41 of the impeller 40, and fuel is drawn into the manifold chamber 43 from the carbureter attached to the coupling 44, through the shaft duct 37, the ports 38 and the ducts 41, and is compressed in its passage to and discharged into the manifold chamber. Upon the charging of the manifold chamber 43, fuel will discharge into the first of the cylinders 13, whose ports 53 and 54 are registered by the port 52 of the disc valve 46, and immediately upon the moving of the port 52 out of such register, the spark plug of this cylinder will be fired by means of a suitable timer associated with an electrical ignition system (not shown) and the contained fuel charge exploded. The gaseous products of the exploded charge will expand within the cylinder, and will discharge outwardly of the port 18 and impact against the flanges or wings 24 of the rotor 23, which will immediately commence its rotation in the direction of the discharge of the gases from the said port 18. During the initial period of rotation, the gases impacted on the wings 24 will be confined within the spaces between adjacent wings for full expanding action, and until the end of the underlying flange 25 is reached, where they will discharge downwardly and pass through the exhaust pipe 32. Immediately upon the firing of the first of the cylinders 13, the remaining ones of the same will be fired in progressive sequence throughout the continued operation of the engine, and in a like manner as in the first instance.

The engine is to be equipped with suitable control devices (not shown) whereby it may be operated after the usual manner of other forms of engines, and which are necessary for the regulation of its speed and otherwise adapting the same for its general or special uses.

It is to be well understood that while the engine has been described in specific terms, and the parts of the same have been illustrated in details of construction and arrangement, various changes in the same may be resorted to throughout a comparatively wide range without departing from the spirit and scope of the invention.

Having thus fully described the invention, what is claimed, is:—

1. An explosive engine comprising a power shaft, a casing surrounding said shaft and including a pair of end plates, a bearing sleeve connecting said plates together and mounted on said shaft, one of said plates having its outer face provided with a depression and the other of said plates formed with inlet openings, a plurality of longitudinally disposed tapered fixed cylinders spaced around said shaft and each having its larger end supported by that plate provided with the inlet openings and its smaller end mounted in that plate formed with the depression, the larger end of each of said cylinders surrounding an inlet opening and the smaller end having an angularly disposed discharge opening communicating with said depression, means positioned against that plate having the depression for closing the latter, means at one end of said casing for distributing a combustible mixture through said inlet openings to said cylinders, means for igniting the combustible charges in said cylinders, and a rotor arranged in said depression and fixed to said shaft and arranged to be rotatably impacted by the gases from said ignited charges in said cylinders exhausted through said discharge openings into said depression.

2. An explosive engine comprising a power shaft, a casing surrounding said shaft and including a pair of end plates, a bearing sleeve connecting said plates together and mounted on said shaft, one of said plates having its outer face provided with a depression and the other of said plates formed with inlet openings, a plurality of longitudinally disposed tapered fixed cylinders spaced around said shaft and each having its larger end supported by that plate provided with the inlet openings and its smaller end mounted in that plate formed with the depression, the larger end of each of said cylinders surrounding an inlet opening and the smaller end having an angularly disposed discharge opening communicating with said depression, means positioned against that plate having the depression for closing the latter, means at one end of said casing for distributing a combustible mixture through said inlet openings to said cylinders, means for igniting the combustible charges in said cylinders, and a rotor arranged in said depression and fixed to said shaft and arranged to be rotatably impacted by the gases from said ignited charges in said cylinders exhausted through said discharge openings into said depression, said rotor having one face provided with impact flanges and the inner wall of said depression in said end plate provided with ribs curved to closely underlie the path of movement of the inner ends of the impact flanges of the rotor.

3. An explosive engine comprising a power shaft, a casing surrounding said shaft and provided with a pair of end plates, a bearing sleeve mounted on the shaft and connecting said end plates together, one of said end plates provided in its outer face with a depression and the other of said end plates formed with inlet openings, a plurality of longitudinally disposed tapered fixed cylinders spaced around said sleeve and each having the larger end supported by that plate provided with the inlet openings and its other end seated in the depressed end plate and formed with an angularly disposed discharge opening communicating with said depression, an intake manifold at one end of said casing, a rotatable disc valve interposed between that end plate having the inlet openings and said manifold and operable to admit through said inlet openings a combustible charge in successive sequence to said cylinders, means for igniting said charges in successive sequence, and a rotor arranged in said depression and fixed to said shaft and positioned to be rotatably impacted by the gases from said ignited charges in said cylinders discharged through said discharge openings into said depression, and means for closing said depression.

4. An explosive engine comprising a power shaft, a casing surrounding said shaft and including a pair of end plates, a bearing sleeve connecting said plates together and mounted on said shaft, one of said plates having its outer face provided with a depression and the other of said plates formed with inlet openings, a plurality of longitudinally disposed tapered fixed cylinders spaced around said shaft and each having its larger end supported by that plate provided with the inlet openings and its smaller end mounted in that plate formed with the depression, the larger end of each of said cylinders surrounding an inlet opening and the smaller end having an angularly disposed discharge opening communicating with said depression, means positioned against that plate having the depressions for closing the latter, means at one end of said casing for distributing a combustible mixture through said inlet openings to said cylinders, means for igniting the combustible charges in said cylinders, and a rotor arranged in said depression and fixed to said shaft and arranged to be rotatably impacted by the gases from said ignited charges in said cylinders exhausted through said discharge openings into said depression, said rotor having one face formed with a series of equidistantly spaced impact flanges, and the inner wall of said depression formed with ribs curved to closely underlie the path of movement of the inner ends of said impact flanges.

5. An explosive engine comprising a casing provided with end plates, a power shaft extending through said casing, a bearing sleeve connecting said end plates and mounted on said shaft, one of said plates having inlet openings, and the other of said plates having its outer face formed with a circular depression, a plurality of longitudinally disposed fixed tapered cylinders surrounding and spaced from said sleeve and each having its larger end supported by that plate provided with the inlet openings and having its smaller end extended into said depressed plate, the larger end of each of said cylinders surrounding an inlet opening and the smaller end formed with an angularly disposed discharge opening communicating with said depression, an intake manifold at one end of the casing, means interposed between that end plate provided with the inlet openings in said manifold and operable to admit through said inlet openings a combustible charge in successive sequence to said cylinders, means for igniting said charges, a rotor arranged in said depression and positioned to be rotatably impacted by the gases from said ignited charges exhausted through the discharge openings of said cylinders into said depression, and an exhaust confining means carried by said depressed end plate.

6. An explosive engine comprising a casing provided with end plates, a power shaft extending through said casing, a bearing sleeve connecting said end plates and mounted on said shaft, one of said plates having inlet openings, and the other of said plates having its outer face formed with a circular depression, a plurality of longitudinally disposed fixed tapered cylinders surrounding and spaced from said sleeve and each having its larger end supported by that plate provided with the inlet openings and having its smaller end extended into said depressed plate, the larger end of each of said cylinders surrounding an inlet opening and the smaller end formed with an angularly disposed discharge opening communicating with said depression, an intake manifold at one end of the casing, means interposed between that end plate provided with the inlet openings and said manifold and operable to admit through said inlet openings a combustible charge in successive sequence to said cylinders, means for igniting said charges, a rotor arranged in said depression and positioned to be rotatably impacted by the gases from said ignited charges exhausted through the discharge openings of said cylinders into said depression, and an exhaust confining means carried by said depressed end plate, said rotor having that face opposing the outer ends of said discharge openings formed with a series of equidistantly spaced impact flanges, and said depression having its inner wall formed with ribs curved to closely underlie the path of movement of the inner ends of said impact flanges.

7. An explosive engine comprising a power shaft, a casing surrounding said shaft and provided with a pair of end plates, a bearing sleeve mounted on the shaft and connecting said end plates together, one of said end plates provided in its outer face with a depression and the other of said end plates formed with inlet openings, a plurality of longitudinally disposed tapered fixed cylinders spaced around said sleeve and each having the larger end supported by that plate provided with the inlet openings and its other end seated in the depressed end plate and formed with an angularly disposed discharge opening communicating with said depression, an intake manifold at one end of said casing, a rotatable disc valve interposed between that end plate having the inlet openings and said manifold and operable to admit through said inlet openings a combustible charge in successive sequence to said cylinders, means for igniting said charges, and a rotor arranged in said depression and fixed to said shaft and positioned to be rotatably impacted by the gases from said ignited charges in said cylinders discharged through said discharge openings into said depression, and means for closing said depression, and said intake manifold having as a part thereof an impeller communicating with the combustible charge supply through said power shaft.

8. An explosive engine comprising a power shaft, a casing surrounding said shaft and including a pair of end plates, a bearing sleeve connecting said plates together and mounted on said shaft, one of said plates having its outer face provided with a depression and the other of said plates formed with inlet openings, a plurality of longitudinally disposed tapered fixed cylinders spaced around said shaft and each having its larger end supported by that plate provided with the inlet openings and its smaller end mounted in that plate formed with the depression, the larger end of each of said cylinders surrounding an inlet opening and the smaller end having an angularly disposed discharge opening communicating with said depression, means positioned against that plate having the depression for closing the latter, means at one end of said casing for distributing a combustible mixture through said inlet openings to said cylinders, means for igniting the combustible charges in said cylinders, and a rotor arranged in said depression and fixed to said shaft and arranged to be rotatably impacted by the gases from said ignited charges in said cylinders exhausted through said discharge openings into said depression, said rotor having one face formed with a series of equidistantly spaced impact flanges, and the inner wall of said depression formed with ribs curved to closely underlie the path of movement of the inner ends of said impact flanges, and said intake manifold having as a part thereof an impeller communicating with the combustible charge supply through said power shaft.

9. An explosive engine comprising a casing provided with end plates, a power shaft extending through said casing, a bearing sleeve connecting said end plates and mounted on said shaft, one of said plates having inlet openings, and the other of said plates having its outer face formed with a circular depression, a plurality of longitudinally disposed fixed tapered cylinders surrounding and spaced from said sleeve and each having its larger end supported by that plate provided with the inlet openings and having its smaller end extended into said depressed plate, the larger end of each of said cylinders surrounding an inlet opening and the smaller end formed with an angularly disposed discharge opening communicating with said depression, an intake manifold at one end of the casing, means interposed between that end plate provided with the inlet openings and said manifold and operable to admit through said inlet openings a combustible charge in successive sequence to said cylinders, means for igniting said charges, a rotor arranged in said depression and positioned to be rotatably impacted by the gases from said ignited charges exhausted through the discharge openings of said cylinders into said depression, and an exhaust confining means carried by said depressed end plate, and said intake manifold having as a part thereof an impeller communicating with the combustible charge supply through said power shaft.

10. An explosive engine comprising a casing provided with end plates, a power shaft extending through said casing, a bearing sleeve connecting said end plates and mounted on said shaft, one of said plates having inlet openings, and the other of said plates having its outer face formed with a circular depression, a plurality of longitudinally disposed fixed tapered cylinders surrounding and spaced from said sleeve and each having its larger end supported by that plate provided with the inlet openings and having its smaller end extended into said depressed plate, the larger end of each of said cylinders surrounding an inlet opening and the smaller end formed with an angularly disposed discharge opening communicating with said depression, an intake manifold at one end of the casing, means interposed between that end plate provided with the inlet openings and said manifold and operable to admit through said inlet openings a combustible charge in successive sequence to said cylinders, means for igniting said charges, a rotor arranged in said depression and positioned to be rotatably impacted by the gases from said ignited charges exhausted through the discharge openings of said cylinders into said depression, and an exhaust confining means carried by said depressed end plate, said rotor having that face opposing the outer ends of said discharge openings formed with a series of equidistantly spaced impact flanges, and said depression having its inner wall formed with ribs curved to closely underlie the path of movement of the inner ends of said impact flanges, and said intake manifold having as a part thereof an impeller communicating with the combustible charge supply through said power shaft.

11. An explosive engine comprising a power shaft, a cylindrical casing provided with a pair of end plates, a bearing sleeve connecting said plates and mounted on said shaft, one of said plates formed with inlet openings and the other of said plates depressed to provide a chamber for the reception of the exhaust gases and a rotor, a plurality of longitudinally disposed cylinders arranged around said sleeve and tapering from the inlet to the discharge end thereof, the discharge end of each of said cylinders mounted in said depressed plate and having a discharge opening for exhaust communicating with said chamber, the larger end of each of said cylinders seated in that plate provided with the inlet openings and further surrounding an inlet opening, an intake manifold arranged adjacent to one end of the casing and provided with openings adapted to register with the inlet openings in said end plate, a valvular element interposed between that end plate having the inlet openings and said manifold and operable to admit through said inlet openings a combustible charge in successive sequence to said cylinders, means for igniting said charges, a rotor fixed to said shaft and arranged within said chamber and further arranged to be rotatably impacted by the exhaust gases from said ignited charges in said cylinders conducted through the discharge openings into the said chamber.

12. An explosive engine comprising a power shaft, a cylindrical casing provided with a pair of end plates, a bearing sleeve connecting said plates and mounted on said shaft, one of said plates formed with inlet openings and the other of said plates depressed to provide a chamber for the reception of the exhaust gases and a rotor, a plurality of longitudinally disposed cylinders arranged around said sleeve and tapering from the inlet to the discharge end thereof, the discharge end of each of said cylinders mounted in said depressed plate and having a discharge opening for exhaust communicating with said chamber, the larger end of each of said cylinders seated in that plate provided with the inlet openings and further surrounding an inlet opening, an intake manifold arranged adjacent to one end of the casing and provided with openings adapted to register with the inlet openings in said end plate, a valvular element interposed between that end plate having the inlet openings and said manifold and operable to admit through said inlet openings a combustible charge in successive sequence to said cylinders, means for igniting said charges, a rotor fixed to said shaft and arranged within said chamber and further arranged to be rotatably impacted by the exhaust gases from said ignited charges in said cylinders conducted through the discharge openings into the said chamber, and said intake manifold including an impeller communicating with the combustible charge supply through said power shaft.

13. An explosive engine comprising a power shaft, a cylindrical casing provided with a pair of end plates, a bearing sleeve connecting said plates and mounted on said shaft, one of said plates formed with inlet openings and the other of said plates depressed to provide a chamber for the reception of the exhaust gases and a rotor, a plurality of longitudinally disposed cylinders arranged around said sleeve and tapering from the inlet to the discharge end thereof, the discharge end of each of said cylinders mounted in said depressed plate and having a discharge opening for exhaust communicating with said chamber, the larger end of each of said cylinders seated in that plate provided with the inlet openings and further surrounding an inlet opening, an intake manifold arranged adjacent to one end of the casing and provided with openings adapted to register with the inlet openings in said end plate, a valvular element interposed between that end plate having the inlet openings and said manifold and operable to admit through said inlet openings a combustible charge in successive sequence to said cylinders, means for igniting said charges, a rotor fixed to said shaft and arranged within said chamber and further arranged to be rotatably impacted by the exhaust gases from said ignited charges in said cylinders conducted through the discharge openings into the said chamber, said rotor having one face provided with equidistantly spaced impact flanges positioned to rotate in the circular path defined by the discharge openings of the cylinders, and said chamber having its inner wall formed with ribs curved to closely underlie the path of movement of the inner ends of the impact flanges.

14. An explosive engine comprising a power shaft, a cylindrical casing provided with a pair of end plates, a bearing sleeve connecting said plates and mounted on said shaft, one of said plates formed with inlet openings and the other of said plates depressed to provide a chamber for the reception of the exhaust gases and a rotor, a plurality of longitudinally disposed cylinders arranged around said sleeve and tapering from the inlet to the discharge end thereof, the discharge end of each of said cylinders mounted in said depressed plate and having a discharge opening for exhaust communicating with said chamber, the larger end of each of said cylinders seated in that plate provided with the inlet openings and further surrounding an inlet opening, an intake manifold arranged adjacent to one end of the casing and provided with openings adapted to register with the inlet openings in said end plate, a valvular element interposed between that end plate having the inlet openings and said manifold and operable to admit through said inlet openings a combustible charge in successive sequence to said cylinders, means for igniting said charges, a rotor fixed to said shaft and arranged within said chamber and further arranged to be rotatably impacted by the exhaust gases from said ignited charges in said cylinders conducted through the discharge openings into the said chamber, and said intake manifold including an impeller communicating with the combustible charge supply through said power shaft, said rotor having one face formed with a series of equidistantly spaced impact flanges positioned to rotate in the circular path defined by the series of discharge openings of the cylinders, and said chamber having its inner wall provided with ribs curved to closely underlie the path of movement of the inner ends of the impact flanges of the rotor.

In testimony whereof, I affix my signature hereto.

JAMES FREDERICK CARNER.